United States Patent
Liu et al.

(10) Patent No.: US 8,296,860 B2
(45) Date of Patent: Oct. 23, 2012

(54) ATOMIC FORCE MICROSCOPY TRUE SHAPE MEASUREMENT METHOD

(75) Inventors: Huiwen Liu, Eden Prairie, MN (US); Lin Zhou, Eagan, MN (US); Dale Egbert, Deephaven, MN (US); Jonathan Arland Nelson, Maple Grove, MN (US); Peter Gunderson, Ellsworth, WI (US)

(73) Assignee: Seagate Technology LLC, Cupertino, CA (US)

( * ) Notice: Subject to any disclaimer, the term of this patent is extended or adjusted under 35 U.S.C. 154(b) by 459 days.

(21) Appl. No.: 12/404,849

(22) Filed: Mar. 16, 2009

(65) Prior Publication Data
US 2010/0235956 A1 Sep. 16, 2010

(51) Int. Cl.
*G01B 5/28* (2006.01)
(52) U.S. Cl. ............. 850/33; 850/1; 850/4; 850/11; 850/19; 850/20; 250/306; 250/307; 250/310; 977/850; 977/851; 977/860; 977/863; 977/872; 73/105
(58) Field of Classification Search .............. None
See application file for complete search history.

(56) References Cited

U.S. PATENT DOCUMENTS

| | | | |
|---|---|---|---|
| 4,752,686 A | 6/1988 | Brust | |
| 5,553,487 A * | 9/1996 | Elings | 73/105 |
| 5,594,845 A | 1/1997 | Florent et al. | |
| 5,715,334 A | 2/1998 | Peters | |
| 5,757,424 A | 5/1998 | Frederick | |
| 5,898,106 A * | 4/1999 | Babcock et al. | 73/105 |
| 6,057,914 A * | 5/2000 | Yedur et al. | 356/124 |
| 6,288,392 B1 * | 9/2001 | Abbott et al. | 850/33 |
| 6,337,479 B1 * | 1/2002 | Kley | 250/234 |
| 6,489,611 B1 * | 12/2002 | Aumond et al. | 850/3 |
| 6,683,316 B2 * | 1/2004 | Schamber et al. | 250/492.1 |
| 6,752,008 B1 | 6/2004 | Kley | |
| 6,862,924 B2 | 3/2005 | Xi et al. | |
| 6,873,867 B2 | 3/2005 | Vilsmeier | |
| 6,975,755 B1 | 12/2005 | Baumberg | |
| 6,980,937 B2 * | 12/2005 | Hayes | 703/2 |
| 6,993,959 B2 * | 2/2006 | Shoelson | 73/105 |
| 7,406,860 B2 | 8/2008 | Zhou et al. | |
| 2001/0038072 A1 * | 11/2001 | Aumond et al. | 250/307 |
| 2002/0008760 A1 | 1/2002 | Nakamura | |
| 2004/0134265 A1 | 7/2004 | Mancevski | |
| 2005/0099494 A1 | 5/2005 | Deng et al. | |
| 2007/0251306 A1 * | 11/2007 | Zhou et al. | 73/105 |
| 2008/0223119 A1 * | 9/2008 | Phan et al. | 73/105 |

* cited by examiner

*Primary Examiner* — Michael Logie
(74) *Attorney, Agent, or Firm* — Mitchell K. McCarthy; McCarthy Law Group

(57) ABSTRACT

An atomic force microscopy (AFM) method includes a scanning probe that scans a surface of a structure to produce a first structure image. The structure is then rotated by 90° with respect to the scanning probe. The scanning probe scans the surface of the structure again to produce a second structure image. The first and second structure images are combined to produce best fit image of the surface area of the structure. The same method is used to produce the best fit image of a flat standard. The best fit image of the flat standard is subtracted from the best fit image of the structure to obtain a true topographical image in which Z direction run out error is substantially reduced or eliminated.

20 Claims, 6 Drawing Sheets

ATOMIC FORCE MICROSCOPY TRUE SHAPE MEASUREMENT METHOD

BACKGROUND

The present invention relates to scanning probe microscopy, and more particularly to using atomic force microscopy (AFM) to produce an image true profile representative of a structure.

AFM is a metrology tool that is useful for measuring and calibrating surface features of structures having dimensions in the nanometer and micrometer range. AFM may be used to scan structures made of any material to produce high resolution two-dimensional profile and three-dimensional images of the structure. AFM is an important tool for measuring dimensions of semiconductor devices, magnetic recording devices, and microelectromechanical system (MEMS) devices.

However, a significant drawback of utilizing AFM with a tube scanner for measuring dimensions is that the images generated are susceptible to a large Z direction run out error ($Z_{rr}$). The large $Z_{rr}$ causes an artificial system "bowing" or "curving" effect in the surface profile of the device being scanned. Over large scan areas $Z_{rr}$ becomes greater, and therefore, can lead to inaccurate measurements of the device being scanned. Thus, for a device requiring a large scan size, for example the entire slider used in a magnetic disc drive, $Z_{rr}$ can prevent performing true shape measurement using AFM.

SUMMARY

An atomic force microscopy (AFM) method includes a scanning probe that scans a surface of a structure to produce a first structure image. The structure is then rotated by 90° with respect to the scanning probe. The scanning probe scans the surface of the structure again to produce a second structure image. The first and second structure images are combined to produce best fit image of the structure with thermal drift error substantially reduced or removed.

Similarly, the scanning probe scans a flat standard surface to produce a first flat standard image. The flat standard is then rotated by 90° with respect to the scanning probe. The scanning probe scans the flat standard surface again to produce a second flat standard image. The first and second flat standard images are combined to produce best fit image of the flat standard.

The best fit image of the flat standard is subtracted from the best fit image of the structure to produce a true topographical image in which Z direction run out error is substantially reduced or eliminated.

DETAILED DESCRIPTION

Figure 1:
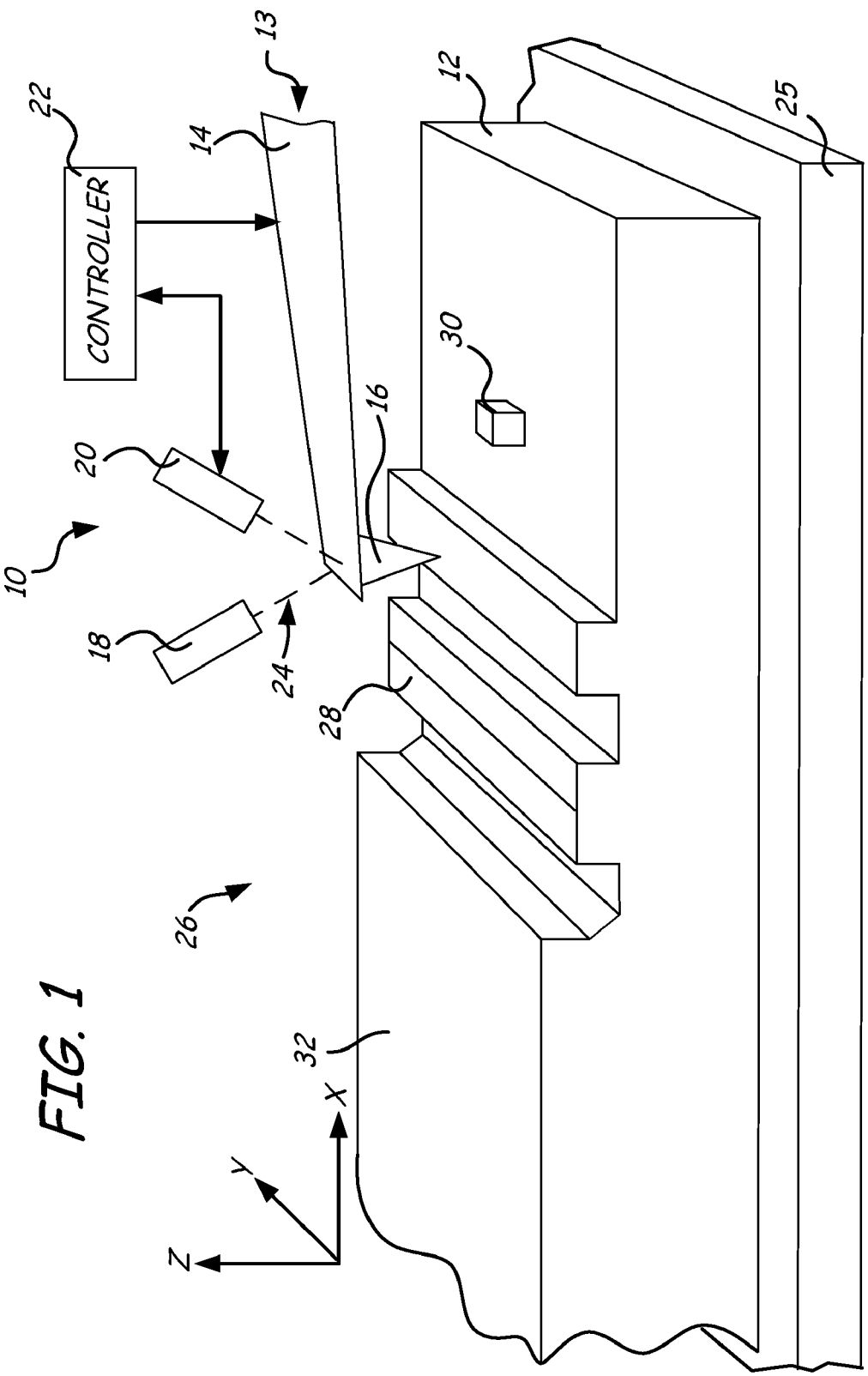
FIG. 1 is a perspective view of an atomic force microscope probe positioned over a surface of a structure.

FIG. 1 is a perspective view a Z scanner portion of an AFM 10 positioned over a surface of a structure 12. The AFM also includes a probe 13 having a cantilever portion 14, a tip portion 16, a laser 18, a photodiode 20, and a controller 22. The laser 18 emits a beam 24. In addition, the AFM includes a close loop flexure based XY scanner 25, which can move sample in X and Y direction with nanometer resolution. In one embodiment, the structure 12 is a magnetic recording head 26 which includes a reader structure 28, a writer structure 30, and a slider 32.

The Z scanner of the AFM 10 (particularly the laser 18, and the photodiode detector 20) is positioned generally above the structure 12. The probe tip 16 extends from the cantilevered portion 14 and is positioned in very close proximity (i.e., within picometers) to the surface of structure 12 to allow measurements of structure 12. The laser 18 emits the beam 24 that is reflected by the cantilever 14 and is received by a photodiode detector 20. The controller 22 receives signals from the photodiode detector 20 and provides signals to control the movement of the structure 12 relative to the probe 13.

In one embodiment, the structure 12 is the pole tip region of a magnetic recording head 26, including the reader structure 28 and writer structure 30. The AFM techniques described herein are useful for measuring and imaging the entire slider 32 or specific features thereof, such as pole tip recession (PTR) features of the writer structure 30. It should be noted that the slider 32 is shown merely for purposes of illustration, and the AFM techniques described herein are also useful for measuring and imaging nanometer and micrometer scale surface features of other structures and measurement objects.

The AFM measures features such as dimensions and the surface profile of the structure 12. The probe tip 16 is moved relative to structure 12 (or vice versa) by using extremely precise XY scanner 25. For example, the controller 22 may control motion of the probe 13 such that the probe tip 16 moves along the surface of the stationary structure 12 in the Z direction. Meanwhile, the controller 22 also controls the flexure based XY scanner 25 to move the structure 12 in X and Y direction while the probe 13 remains stationary. By utilizing the XY scanner 25 decouples the XY motion from the Z motion, thereby reducing $Z_{rr}$. As the probe tip 16 moves over the surface of structure 12, features on the surface of structure 12 cause cantilever 14 to bend in response to the force between probe tip 16 and structure 12.

The photodiode detector 20 measures the amount of deflection in the cantilever 14, which is used to generate an image representation of the structure 12. In particular, the laser 18 reflects the light beam 24 off of the cantilever 14 to the photodiode detector 20. The photodiode detector 20 may include four side-by-side photodiodes such that the difference between the signals generated by the photodiodes indicates the position of the light beam 24 on the photodiode detector 20, and thus the angular deflection of the cantilever 14. Because the distance between the cantilever 14 and the photodiode detector 20 is generally thousands of times the amount of bending of the cantilever 14, the motions of the probe tip 16 are greatly magnified allowing very precise measurements of the structure 12 to be obtained.

As alluded to earlier, one way to significantly reduce the AFM $Z_{rr}$ is to use the flexure based linear XY scanner 25. This scanner decouples the XY motion from the Z motion. However, a conventional flexure based XY scanner 25 still has some residual $Z_{rr}$ of around 2 nanometers (nm) over a 100 micrometer (um) scan size. It has been recognized that this error is due to the fact that conventional flexure based scanners overlay the X flexure on the Y flexure, and that Y scanning direction's $Z_{rr}$ is always much larger than that of the X scanning direction. Thus, a scan along the X direction contains less system error than scan along the Y direction. In the discussion herein, an exemplary XY flexure scanner 25 is provided, however, the methods and techniques also can be applied to a tube scanner to reduce $Z_{rr}$.

Figure 2:
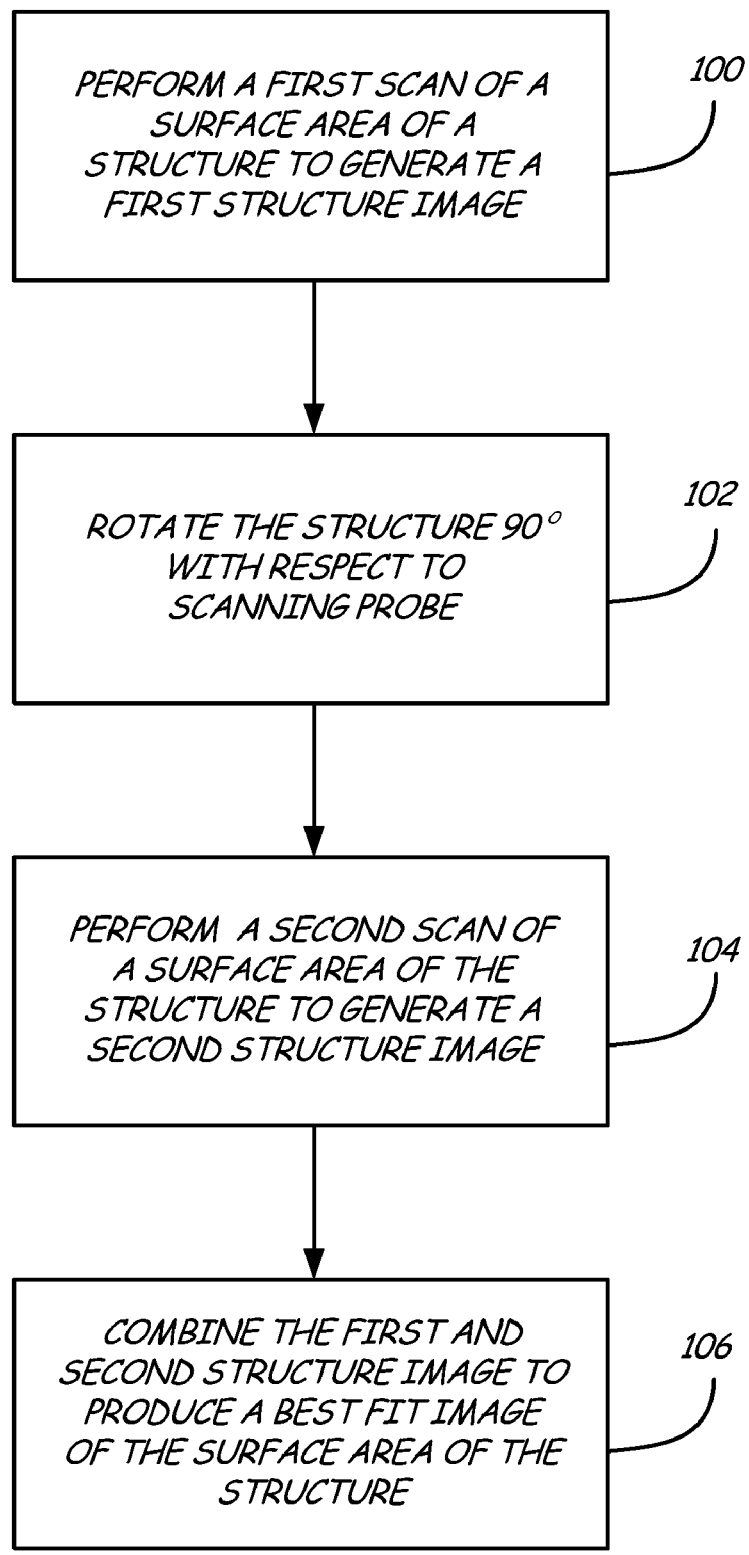
FIG. 2 is a flow diagram showing a process for generating a best fit image of a structure utilizing AFM scans.
Figure 3:
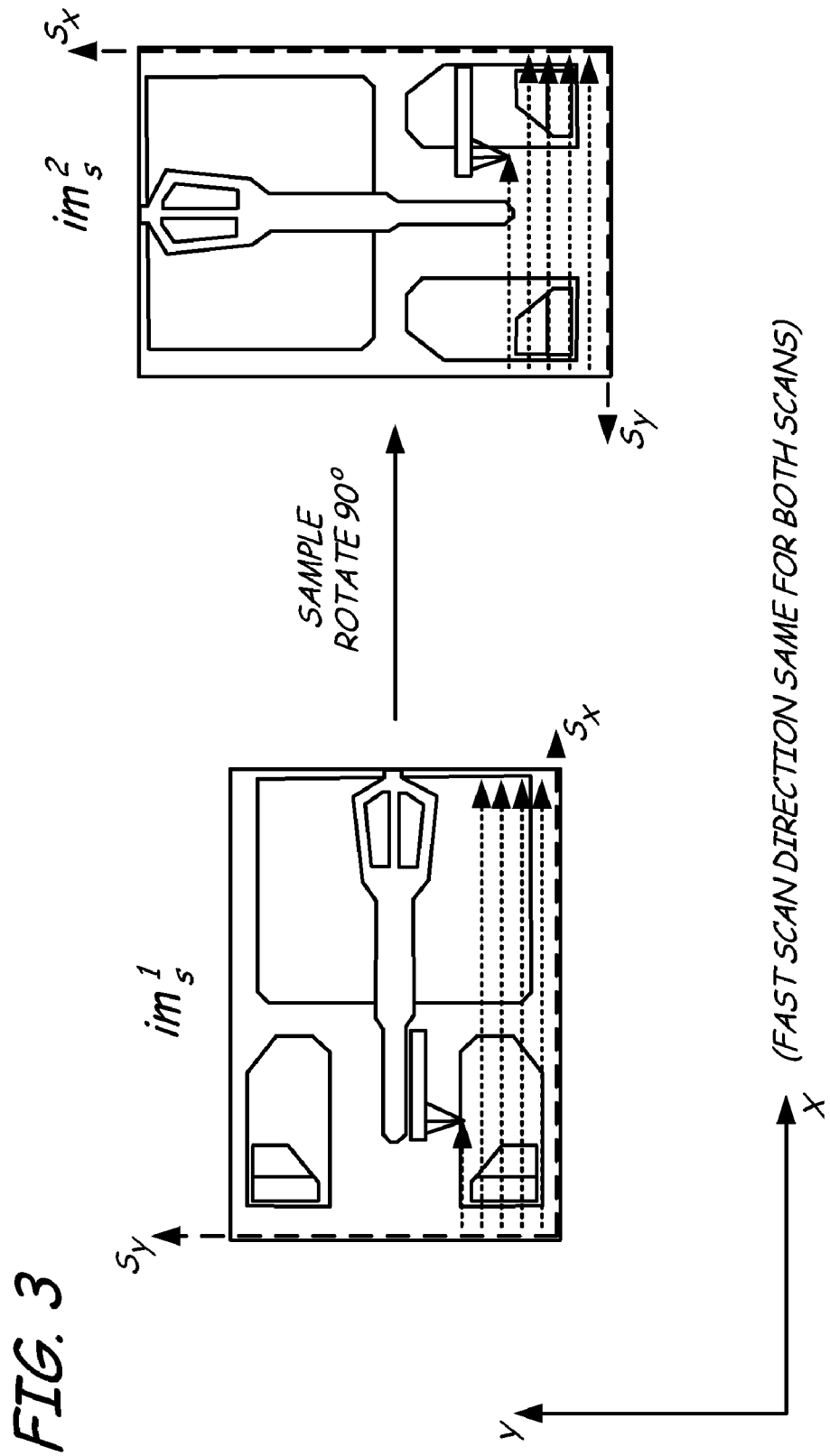
FIG. 3 is a schematic view of a first scan and a second scan of the structure discussed in the flow diagram of FIG. 2.

FIG. 2 is a flow diagram showing a process for generating a best fit image of a structure utilizing AFM scans. FIG. 3 is a schematic view of first and second scans that can be used for correcting slow scan direction thermal drift in an AFM scan. To generate a true topographical image of a structure, two images, one a best fit image of the structure and the other a best fit image of a flat standard surface are subtracted to reduce $Z_{rr}$. The best fit image of the structure is generated by combining a first and a second structure image of the structure. In both scans, the X scanning direction is used as the fast scan direction, which is also the scan direction that has the smallest $Z_{rr}$ as discussed previously. Prior to the second scan, the structure is rotated by 90° with respect to the probe 13 while keeping the same X and Y offset (FIG. 1). The best fit image of the standard surface is generated by combining first and second flat standard images of the flat standard surface using the same principle as described above for obtaining the best fit structure image.

The first scan shown in FIG. 3 is performed as step 100 of FIG. 2 to generate a first structure image $im_s^1$. The structure 12 is then rotated 90° with respect to the probe 13 (step 102). The second scan (shown in FIG. 3) is performed as step 104 of FIG. 2 to generate a second structure image $im_s^2$. The two scans in FIG. 3 are performed using the same fast scanning direction as illustrated by the dashed arrow lines, the same offset, and the same scan area of the structure 12, but the structure 12 has been rotated 90° (FIGS. 1 and 3) in between the two scans. Thus, in one embodiment, the X scan direction is the fast scan direction in both the first and second scans shown in FIG. 3. The scan patterns shown in FIG. 3, while not necessarily representative of an actual scan pattern, are representative of scan patterns having the fast scan direction in the same direction in both scans.

In FIG. 3, the first scan of the structure can be represented by a matrix of data points which form the first structure image $im_s^1$. Similarly, the second scan of the structure shown in FIG. 3 can be represented by a matrix of data points, which form the second structure image $im_s^2$. The first structure image $im_s^1$ and the second structure image $im_s^2$ data are combined to form a best fit structure image $im_s^b$ (step 106) according to the following Equation 1:

$$im_s^b = \frac{1}{2}(a_{ij} + b_{ij}) + \frac{1}{2n}\left[\left[\begin{array}{c}1\\ \vdots \\ 1\end{array}\right] \cdot \sum_{i=1}^{n} a_{ij} - \sum_{j=1}^{n} a_{ij} \cdot [1 \ \ldots \ 1]\right] - \left[\begin{array}{c}1\\ \vdots \\ 1\end{array}\right] \cdot \sum_{i=1}^{n} b_{ij} - \sum_{j=1}^{n} b_{ij} \cdot [1 \ \ldots \ 1]. \quad \text{(Equation 1)}$$

where $a_{ij}=im_s^1$, $b_{ij}=im_s^2$, ij represents the pixel value of line i and column j of $im_s^1$ and $im_s^2$, and n represents total number of ij values (i.e. the total pixel number for the image).

Equation 1 (represented above) allows one to generate a more accurate best fit structure image $im_s^b$, because the first structure image $im_s^1$ captures accurate data in the fast scan $S_x$ direction and the second structure image $im_s^2$ captures accurate data in the fast scan $S_y$ direction. Both scans along the slow scan direction contain thermal drift error. During the first scan, the $S_x$ direction of the structure is aligned with the fast scan direction of the AFM, and during the second scan the $S_y$ direction of the structure is aligned with the fast scan direction of the AFM. Equation 1 offers a novel way to flatten the image of a complicated structure surface so that thermal drift in the slow scan direction can be substantially eliminated. In addition to that, since both images are fast scanned along the X direction (which has the smallest $Z_{rr}$), the best fit structure image $im_s^b$ has the smallest residual $Z_{rr}$.

The best fit structure image $im_s^b$ is a combination of a true structure image $im_f^t$ and a minimum AFM system Z run out error $im_{s\_Zrr}$. Thus, the best structure image $im_s^b$ can be represented as:

$$im_s^b = im_s^t + im_{s\_Zrr} \quad \text{(Equation 2).}$$

For a scan larger than 50 micrometers, a measurable bowing can occur in a flexure XY scanner, which can produce curvature in the resulting image. As discussed previously, it is hard to completely eliminate the bowing of a XY flexure scanner using conventional techniques. Additionally, the amplitude and shape of the bowing vary between AFMs, and may change with time, temperature, and humidity. Positional offsets between scans of the same surface can also vary the curvature in the corresponding image.

To eliminate the contribution of bowing to measurement error, a reference scan needs to be taken on a flat standard surface with the same scan settings (e.g., scan size and offsets) as that of a structure scan. The reference scan is subsequently subtracted from the regular scan to obtain an image with minimum bowing error.

Figure 4:
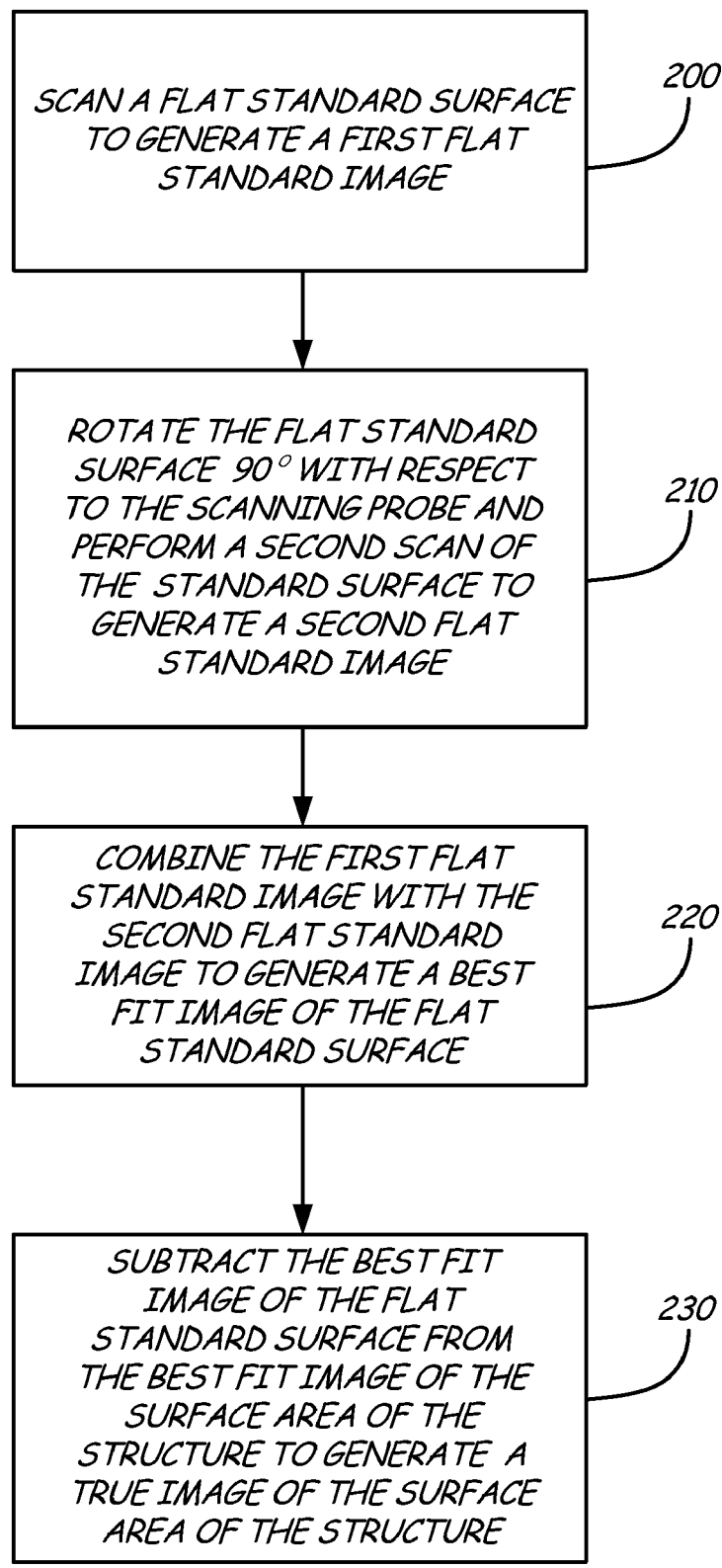
FIG. 4 is a flow diagram showing steps for correcting image curvature artifacts due to the bowing effect to generate a true image of the structure.

FIG. 4 is a flow diagram showing steps for correcting image curvature artifacts due to the bowing effect to generate a true image of the structure 12. The best fit image of the flat standard is obtained by combining a first and a second scan using the same principles and techniques as described for obtaining the best fit structure image (FIG. 2).

The first flat standard surface image $im_f^1$ is generated by scanning a first flat standard surface with the X scan direction being the fast scan direction (step 200). In one embodiment, a flat surface such as an air bearing surface of the slider 32 in FIG. 1 may be used as the flat standard sample surface. Alternatively, a silicon carbate flat standard, silicon wafer, or mirror standard could be used as the flat standard sample surface. The structure 12 is then rotated 90° with respect to the probe 13 and rescanned to generate the second flat standard surface image $im_f^2$ (step 210). The first flat standard surface image $im_f^1$ and the second flat standard surface image $im_f^2$ are combined to generate a best fit image of the standard $im_f^b$. The best fit image of the standard $im_f^b$ is subtracted from and the best fit image of the structure $im_s^b$ to produce a true topographical image in which Z direction run out error is minimized (step 230).

For the structure and the flat standard sample, the second scan after rotating the sample 90° should be performed under same conditions (e.g. scan size and offset) so as to minimize error in the reference scan. This is because the bowing error is proportional to the scan size and the X and Y offset.

After the flat standard structure has been scanned using the same principle as the scans on the structure, the first flat standard surface image $im_f^1$ and the second flat standard surface image $im_f^2$ are combined to generate a best fit image of the flat standard $im_f^b$ by subbing $im_f^1$ and $im_f^2$ into Equation 3: (also used as Equation 1)

$$im_s^b = \frac{1}{2}(a_{ij} + b_{ij}) +$$

$$\frac{1}{2n}\left[\begin{bmatrix}1\\ \vdots\\ 1\end{bmatrix} \cdot \sum_{i=1}^{n} a_{ij} - \sum_{j=1}^{n} a_{ij} \cdot [1 \ \ldots \ 1] - \begin{bmatrix}1\\ \vdots\\ 1\end{bmatrix} \cdot \sum_{i=1}^{n} b_{ij} - \right.$$

$$\left. \sum_{j=1}^{n} b_{ij} \cdot [1 \ \ldots \ 1] \right].$$

(Equation 3)

where $a_{ij}=im_f^1$, $b_{ij}=im_f^2$, ij represents the pixel value of line i and column j of $im_f^1$ and $im_f^2$, and n represents total number of ij values.

The best fit image of the flat standard $im_f^b$ is a combination of a true flat standard image $im_f^t$ and system run out error $im_{f\_Zrr}$. Thus, the flat best fit image $im_f^b$ can be represented as:

$$im_f^b = im_f^t + im_{f\_Zrr}$$ (Equation 4).

The best fit image of flat standard $im_f^b$ is subtracted from the best fit structure image $im_s^b$ to correct curvature artifacts caused by the bowing effect in the scanner to obtain a true shape $im_s^t$ (step 230). More particularly, true shape $im_s^t$ can be approximated by:

$$\nabla = im_s^b - im_f^b$$

$$= (im_s^t + im_{s\_Zrr}) - (im_f^t + im_{f\_Zrr}).$$

(Equation 5)

This approximation is accurate because $im_{s\_Zrr} \approx im_{f\_Zrr}$ and $im_f^t$ is a constant. Thus, $$im_s^t = \nabla$$ (Equation 6).

In review, because the bowing effect will cause the same artifacts in the best fit flat standard image $im_f^b$ and the best fit structure image $im_s^b$, the curvature in the best fit structure image $im_s^b$ can be substantially eliminated by subtracting the flat best fit image $im_f^b$ from the best fit structure image $im_s^b$ to generate the true shape $im_s^t$ (step 230). In addition, the feedback on the close loop XY linear scanner assures that the two scans are performed in the same X and Y offset, thus limiting curvature artifacts caused by positional offsets in the scan pattern.

The aforementioned methods and techniques offer a novel way to flatten images so that system thermal drift in the slow scan direction can be substantially eliminated. More importantly, the methods also offer a way to significantly remove the XY scanner $Z_{rr}$ by image subtraction. The methods and techniques allow one to obtain a more accurate true shape $im_s^t$ of the structure by removing the $Z_{rr}$ and thermal drift caused error. A more accurate measurement of the features of a device is important in improving various aspects of the product development of the device, including design improvement, device model validation, and device performance enhancement.

Figure 5:
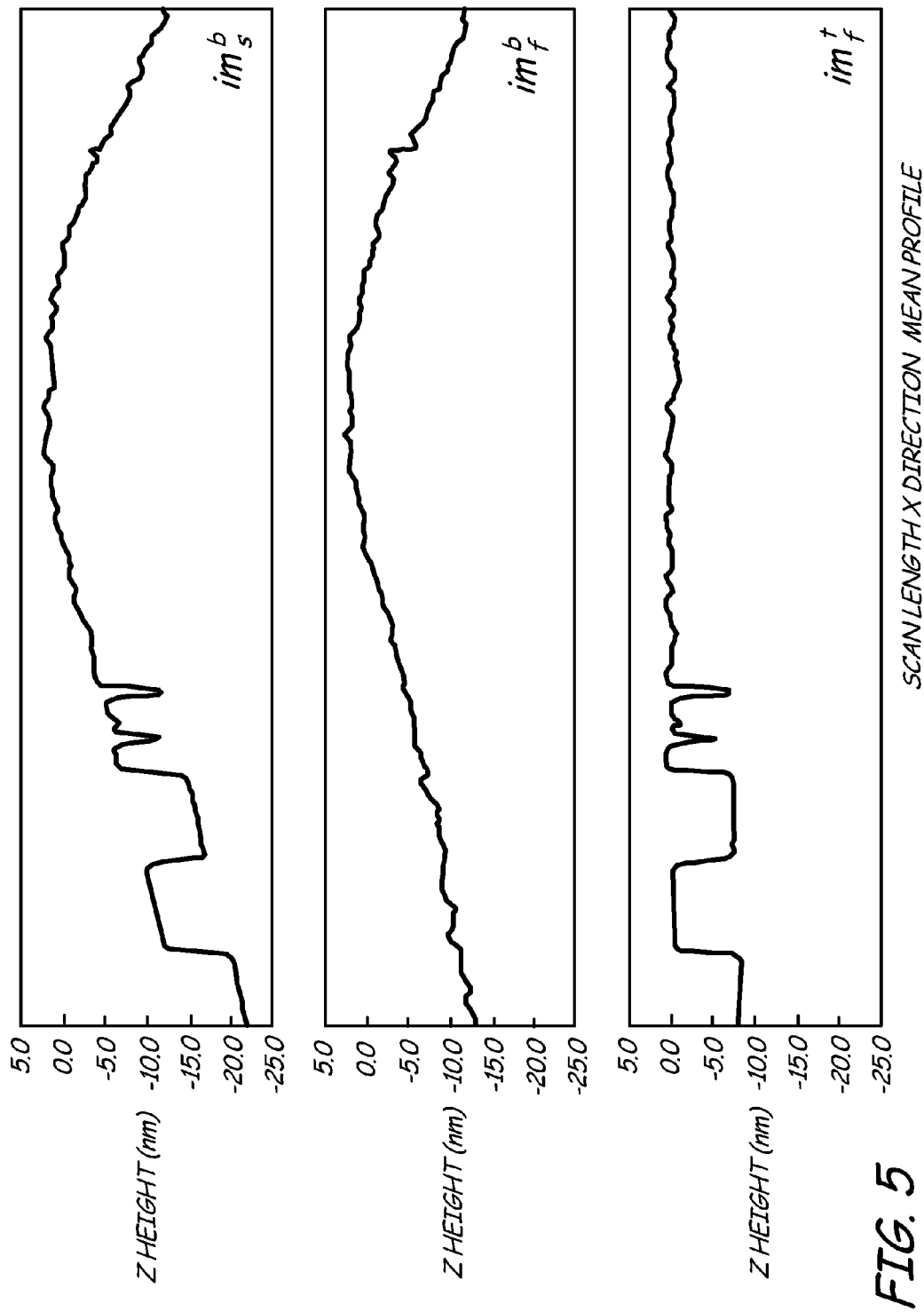
FIG. 5 is a graph showing a process for removing the $Z_{rr}$ by subtracting the flat standard image from the structure image to generate the true shape of the structure discussed in the flow diagram of FIG. 4.

FIG. 5 shows that the mean profile of the best fit image of the structure $im_s^b$ along X direction contains shape information mixed with $Z_{rr}$ error. Therefore, the profile generated can show some of the structure's shape information, but also shows a relatively large bowing feature. Likewise, the mean profile of the flat standard $im_f^b$ is has a large $Z_{rr}$, this leads to the relatively large bow in the profile. After image subtraction of $im_f^b$ from $im_s^b$, the resulting mean profile of $im_s^t$ eliminates the $Z_{rr}$ bowing error, and shows the true shape of the structure.

Figure 6:
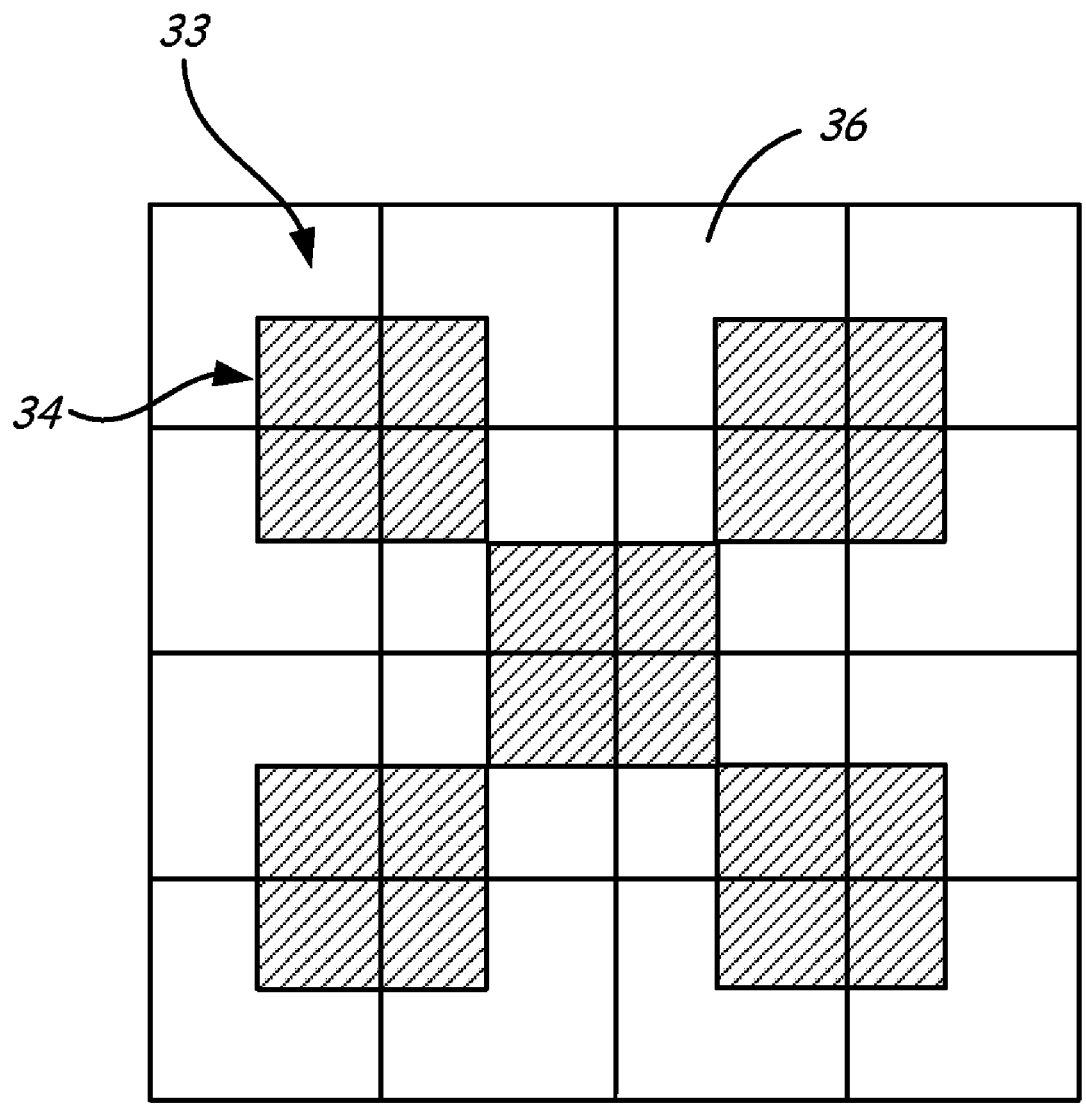
FIG. 6 is a schematic view of an AFM image stitching method to obtain a larger scan image.

FIG. 6 demonstrates a technique for acquiring accurate true shape information if a feature of a structure is larger than the max scan range of the XY scanner. Multiple bridging images 34 may be performed to produce a merged image 36. Each of the individual image 33 and bridging image 34 is obtained by the aforementioned methods and techniques for removing the thermal drift and system $Z_{rr}$ error. These scans are ultimately integrated into the merged image 36 by, for example, "stitching", or "bridging" the scans of the areas of interest together by overlapping and aligning common data points.

Although the present invention has been described with reference to preferred embodiments, workers skilled in the art will recognize that changes may be made in form and detail without departing from the spirit and scope of the invention.

The invention claimed is:

1. An atomic force microscopy (AFM) method comprising:
   scanning a surface with a scanning probe in a selected fast scan direction to produce a first surface image, the selected fast scan direction corresponding to a comparably smaller out-of-plane run out error of the scanning probe in comparing respective out-of-plane run out errors of the scanning probe for each of two different scanning directions;
   after the scanning to produce the first surface image, rotating the surface physically with respect to the scanning probe;
   after the rotating, scanning the surface with the scanning probe in the selected fast scan direction to produce a second surface image; and
   combining the first and second surface images to produce an image of the surface.

2. The method of claim 1 and further comprising:
   scanning a flat standard surface with the scanning probe to produce a first flat standard image;
   rotating the flat standard surface physically; and
   scanning the flat standard surface with the scanning probe to produce a second flat standard image.

3. The method of claim 2 and further comprising:
   combining the first and second flat standard image to produce an image of the flat standard surface.

4. The method of claim 3 and further comprising: combining the image of the surface and the image of the flat standard surface.

5. The method of claim 4, wherein combining the image of the surface and the image of the flat standard surface comprises:
   subtracting the image of the flat standard surface from the image of the surface to produce a true image of the surface.

6. The method of claim 1, wherein a scanner portion of the AFM is an XY scanner and the selected fast scan direction of the scanner is in the X scan direction.

7. The method of claim 1, further comprising scanning the surface in a slow scan direction.

8. The method of claim 7, wherein the scanning is characterized by the selected fast scan direction being substantially orthogonal to the slow scan direction.

9. The method of claim 1, wherein the combining is characterized by producing a predetermined image of the surface.

10. A method for generating a topographic image of a surface with an AFM, the method comprising:

scanning the surface in a selected fast scan direction and a slow scan direction with a scanning probe to produce a first surface image, the selected fast scan direction corresponding to a comparably smaller out-of-plane run out error of the scanning probe in comparing respective out-of-plane run out errors of the scanning probe for each of two different scanning directions;

after the scanning to produce the first surface image, rotating the surface physically with respect to the selected fast scan direction and the slow scan direction;

scanning the surface, after rotating, in the selected fast scan direction and the slow scan direction with the scanning probe to produce a second surface image; and combining the first surface image and the second surface image to produce an image of the surface.

11. The method of claim 10 and further comprising:

scanning a flat standard sample in the selected fast scan direction and the slow scan direction with the scanning probe to produce a first flat standard image;

rotating the flat standard sample physically with respect to the selected fast scan direction and the slow scan direction;

scanning the flat standard sample, after rotating, in the selected fast scan direction and the slow scan direction with the scanning probe to produce a second flat standard image.

12. The method of claim 11 and further comprising:

combining the first flat standard image and the second flat standard image to produce a flat standard image.

13. The method of claim 12 and further comprising:

subtracting the surface image and the flat standard image to produce a topographic image of the surface.

14. The method of claim 13, wherein combining the surface image and the flat standard image comprises:

subtracting the flat standard image from the surface image.

15. The method of claim 10, wherein a scanner portion of the AFM is an XY scanner and the selected fast scan direction of the scanner is in the X scan direction.

16. An atomic force microscopy (AFM) method comprising:

scanning a flat standard surface with the scanning probe to produce a first flat standard image;

rotating the flat standard surface by 90°;

scanning the flat standard surface with the scanning probe to produce a second flat standard image;

combining the first and second flat standard images to produce a best fit image of the flat standard surface; and combining the best fit image of the flat standard surface with a best fit image of a surface of a structure.

17. The method of claim 16 wherein the best fit image of a surface of a structure is characterized by:

scanning a surface area of a structure with a scanning probe to produce a first structure image;

rotating the structure by 90° with respect to the scanning probe;

scanning the surface area of the structure with the scanning probe to produce a second structure image; and combining the first and second structure image to produce the best fit image.

18. The method of claim 17, wherein the combining the best fit image of the flat standard surface with a best fit image of a surface of a structure is characterized by subtracting the best fit image of the flat standard surface from the best fit image of the surface area of the structure to produce a true image of the structure.

19. The method of claim 17, wherein the scanning a surface area of a structure with the scanning probe to produce a first structure image is characterized by scanning in a fast scan direction, and the scanning the scanning the surface area of the structure with the scanning probe to produce a second structure image is characterized by scanning along the same fast scan direction.

20. The method of claim 19, wherein the fast scan direction is aligned with a predetermined axis of the AFM method that is associated with a minimum bowing effect.

* * * * *